(12) United States Patent
Xiao et al.

(10) Patent No.: US 10,177,425 B2
(45) Date of Patent: Jan. 8, 2019

(54) BATTERY PACK

(71) Applicant: LG Chem, Ltd., Seoul (KR)

(72) Inventors: Meng Xiao, Sterling Heights, MI (US); Scott Dudley, Commerce Township, MI (US)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/498,912

(22) Filed: Apr. 27, 2017

(65) Prior Publication Data

US 2018/0316072 A1    Nov. 1, 2018

(51) Int. Cl.
*H01M 10/613*   (2014.01)
*H01M 10/625*   (2014.01)
*H01M 10/6556*  (2014.01)

(52) U.S. Cl.
CPC ..... *H01M 10/6556* (2015.04); *H01M 10/613* (2015.04); *H01M 10/625* (2015.04); *H01M 2220/20* (2013.01)

(58) Field of Classification Search
CPC ............. H01M 10/613; H01M 10/625; H01M 10/6554; H01M 10/6556
See application file for complete search history.

(56) References Cited

U.S. PATENT DOCUMENTS

| | | | |
|---|---|---|---|
| 6,783,630 B2 | 8/2004 | Shajii et al. | |
| 7,166,187 B2 | 1/2007 | Shajii et al. | |
| 9,537,127 B2 | 1/2017 | Schreiber et al. | |
| 2013/0192507 A1 | 8/2013 | Chu et al. | |
| 2015/0140388 A1* | 5/2015 | Harada | H01M 10/617 429/120 |

OTHER PUBLICATIONS

U.S. Appl. No. 15/149,288, filed May 9, 2016 entitled Thermally Conductive Base Member and Method of Assembling the Thermally Conductive Base Member.
U.S. Appl. No. 15/446,733, filed Mar. 1, 2017 entitled Battery Pack.

\* cited by examiner

*Primary Examiner* — Brittany L Raymond
(74) *Attorney, Agent, or Firm* — Buckert Patent & Trademark Law Firm PC; John F. Buckert

(57) ABSTRACT

A battery pack includes a battery module with a bottom surface, and a cooling plate with a sheet member that holds the battery module thereon. The sheet member has first and second flow channels extending substantially parallel to one another. The first flow channel is disposed closer to a first longitudinal edge of the sheet member than the second flow channel. The first flow channel has a first cross-sectional area and a coolant flowing through the first flow channel having a first velocity. The second flow channel has a second cross-sectional area that is less than the first cross-sectional area of the first flow channel such that the coolant flowing through the second flow channel has a second velocity that is greater than the first velocity.

15 Claims, 8 Drawing Sheets

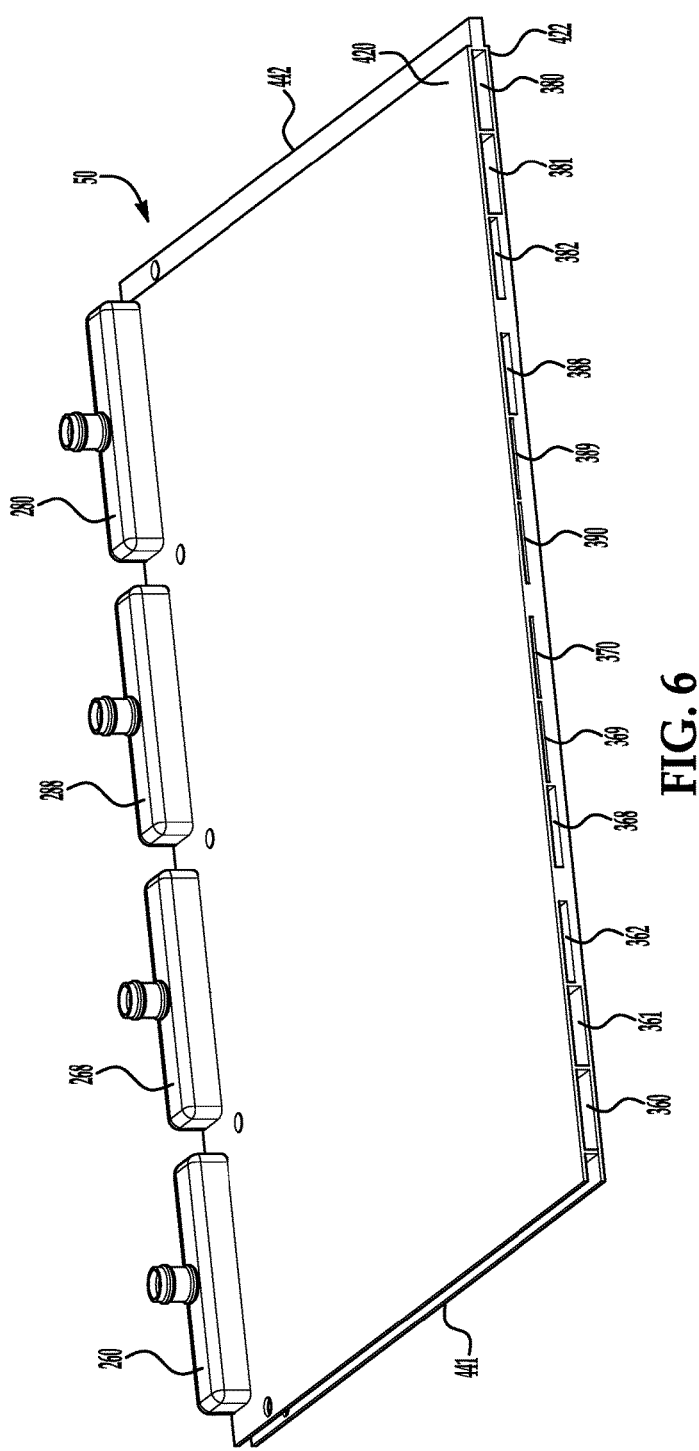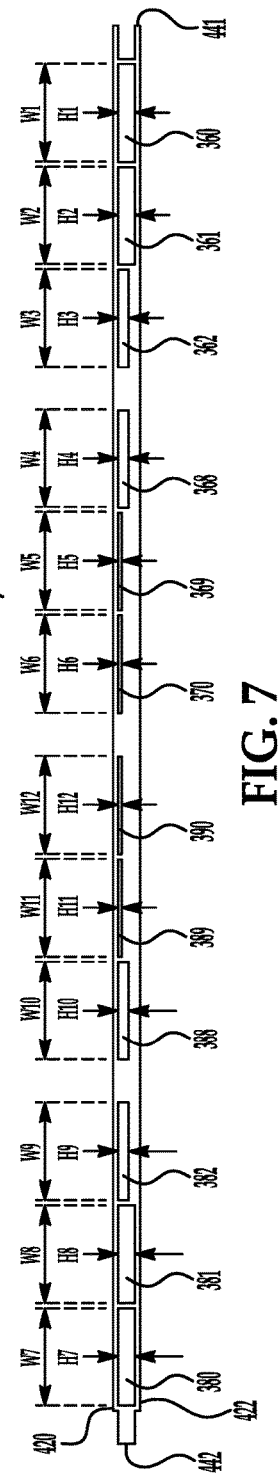
FIG. 6
FIG. 7

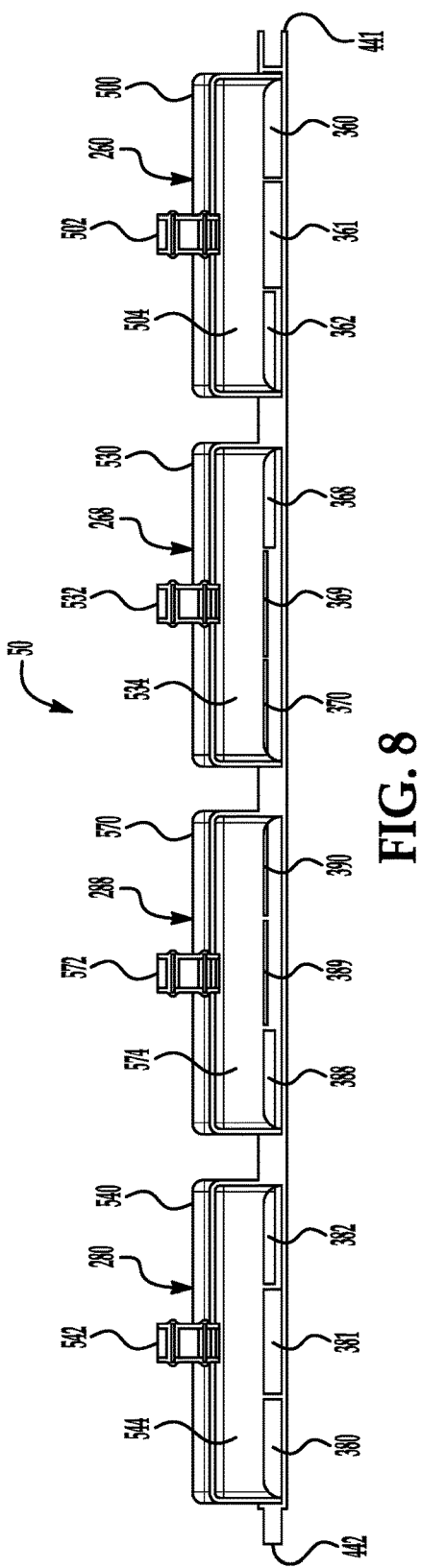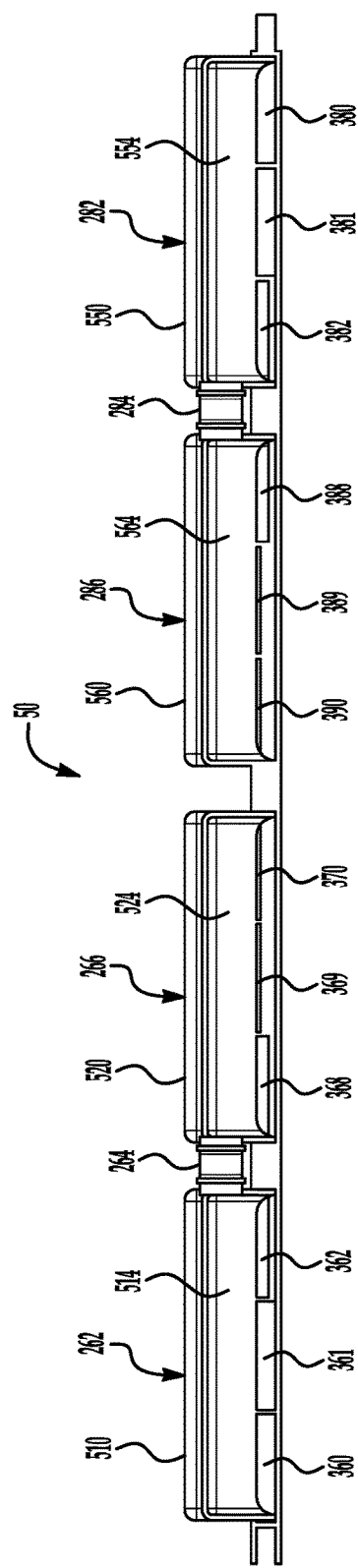

BATTERY PACK

BACKGROUND

A battery pack has a battery module therein. A problem with the battery pack is that the battery module has a centrally located region that can have an elevated temperature level as compared to a temperature level of peripheral regions of the battery module, which can degrade operation of the battery module over time.

The inventors herein have recognized a need for a battery pack having a cooling plate with targeted cooling that can cool a centrally located region of the battery module to a greater extent than peripheral regions of the battery module to obtain a relatively uniform operating temperature within the battery module. In particular, the inventors herein have recognized a need for a battery pack having a cooling plate with first and second flow channels therein with first and second cross-sectional areas, respectively, in which the second cross-sectional area is less than the first cross-sectional area and in which a coolant traveling through the second flow channel has an increased velocity (as compared to the velocity in the first flow channel) to cool a centrally located region of the battery module disposed on the cooling plate and directly above the second flow channel to a greater extent than a peripheral region of the battery module disposed directly above the first flow channel.

SUMMARY

A battery pack in accordance with an exemplary embodiment is provided. The battery pack includes a battery module having a bottom surface. The battery pack further includes a cooling plate having a sheet member. The bottom surface of the battery module is disposed on a top surface of the sheet member. The sheet member extends along a longitudinal axis and has first and second flow channels. The first and second flow channels extend substantially parallel to the longitudinal axis within the sheet member and substantially parallel to one another. The sheet member further includes first and second longitudinal edges extending substantially parallel to the longitudinal axis. The first flow channel is disposed closer to the first longitudinal edge of the sheet member than the second flow channel. The first flow channel has a first cross-sectional area and a coolant flowing through the first flow channel having a first velocity. The second flow channel has a second cross-sectional area that is less than the first cross-sectional area of the first flow channel such that the coolant flowing through the second flow channel has a second velocity that is greater than the first velocity.

BRIEF DESCRIPTION OF THE DRAWINGS

FIG. 6 is a schematic of a portion of the cooling plate of FIG. 4;

FIG. 7 is a cross-sectional schematic of the cooling plate of FIG. 5 taken along lines 7-7;

FIG. 8 is a cross-sectional schematic of the cooling plate of FIG. 4 taken along lines 8-8;

FIG. 9 is a cross-sectional schematic of the cooling plate of FIG. 4 taken along lines 9-9.

DETAILED DESCRIPTION

Figure 1:
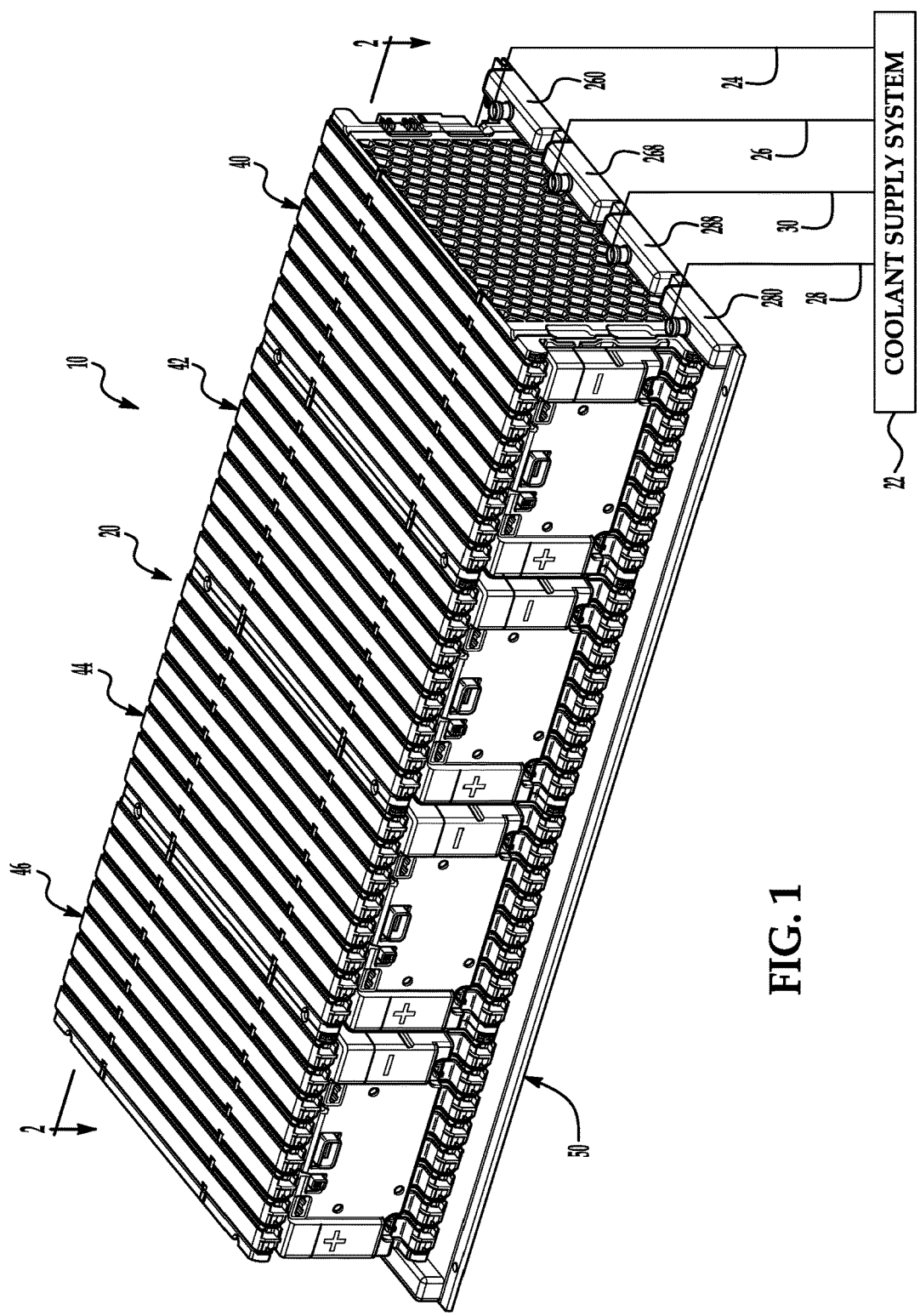
FIG. 1 is a schematic of a vehicle having a battery pack in accordance with an exemplary embodiment, and a coolant supply system.

Referring to FIGS. 1-4, a vehicle 10 having a battery pack 20 in accordance with an exemplary embodiment, a coolant supply system 22, and conduits 24, 26, 28, 30 is provided. The coolant described herein can either be a fluid or a refrigerant.

The battery pack 20 includes battery modules 40, 42, 44, 46 and a cooling plate 50. The battery pack 20 extends along a longitudinal axis 38 (shown in FIG. 3). An advantage of the cooling plate 50 is that the cooling plate 450 has at least first and second flow channels therein with first and second cross-sectional areas, respectively, in which the second cross-sectional area is less than the first cross-sectional area and in which a coolant traveling through the second flow channel has an increased velocity (as compared to the velocity in the first flow channel) to cool a centrally located region of the battery module disposed on the cooling plate and directly above the second flow channel to a greater extent than a peripheral region of the battery module disposed directly above the first flow channel. The battery modules 40, 42, 44, 46 have an identical structure to one another. Accordingly, only the structure of the battery module 40 will be discussed in greater detail hereinafter.

Figure 2:
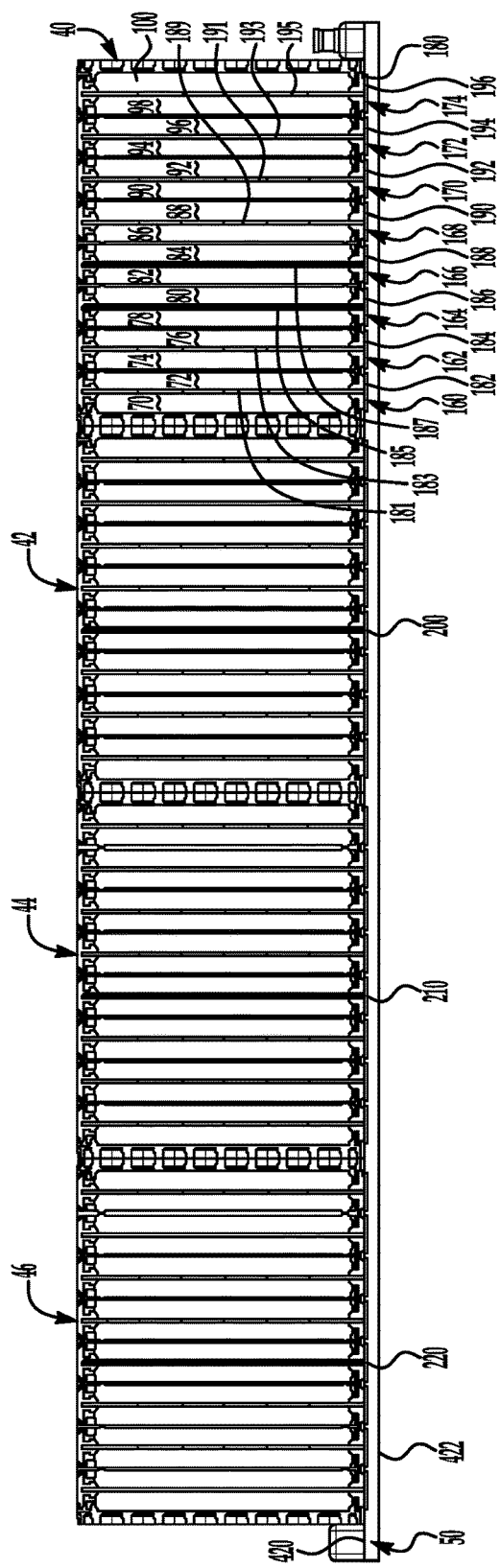
FIG. 2 is a cross-sectional view of the battery pack of FIG. 1 taken along lines 2-2 in FIG. 1.
Figure 3:
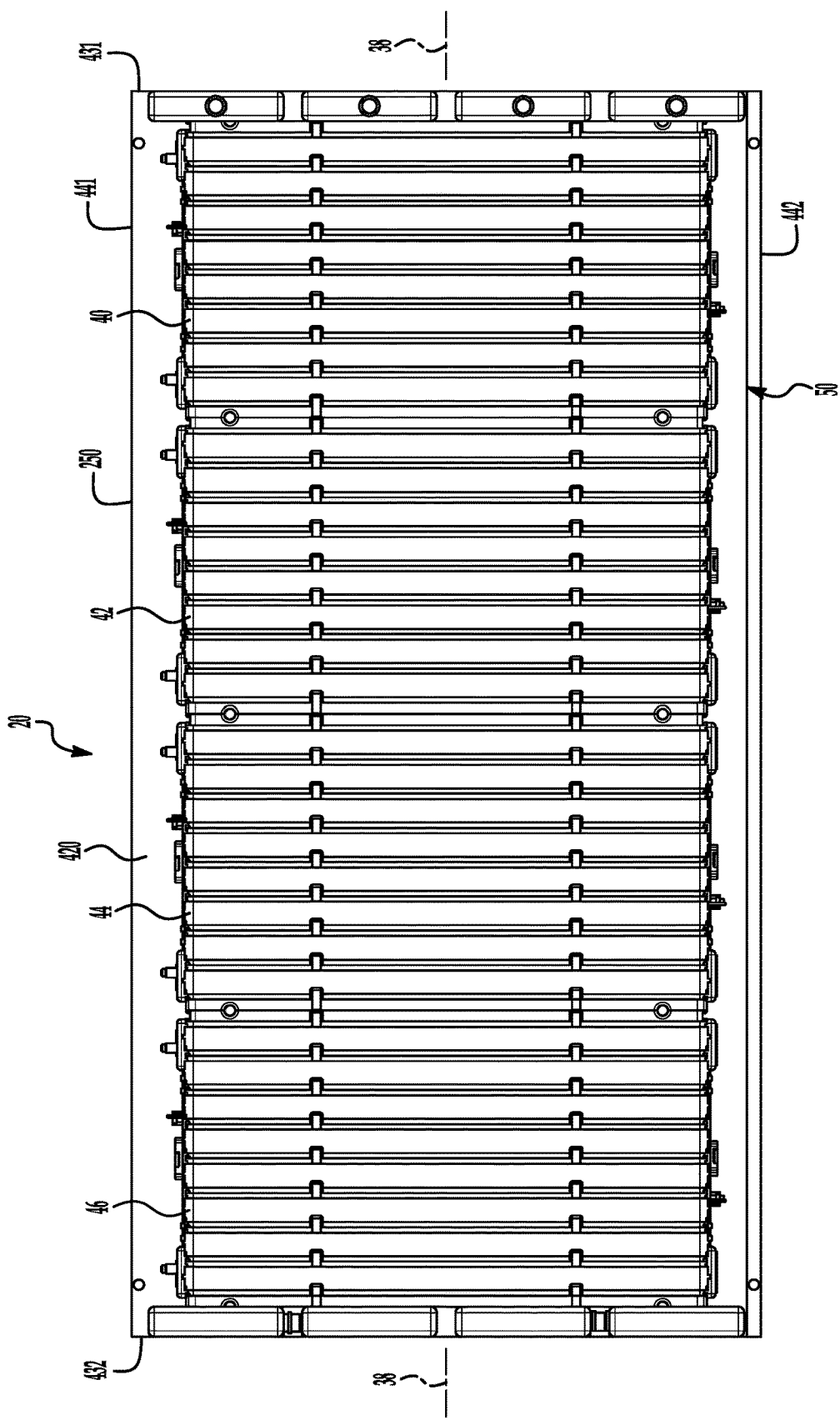
FIG. 3 is a schematic of a top view of the battery pack of FIG. 1.
Figure 4:
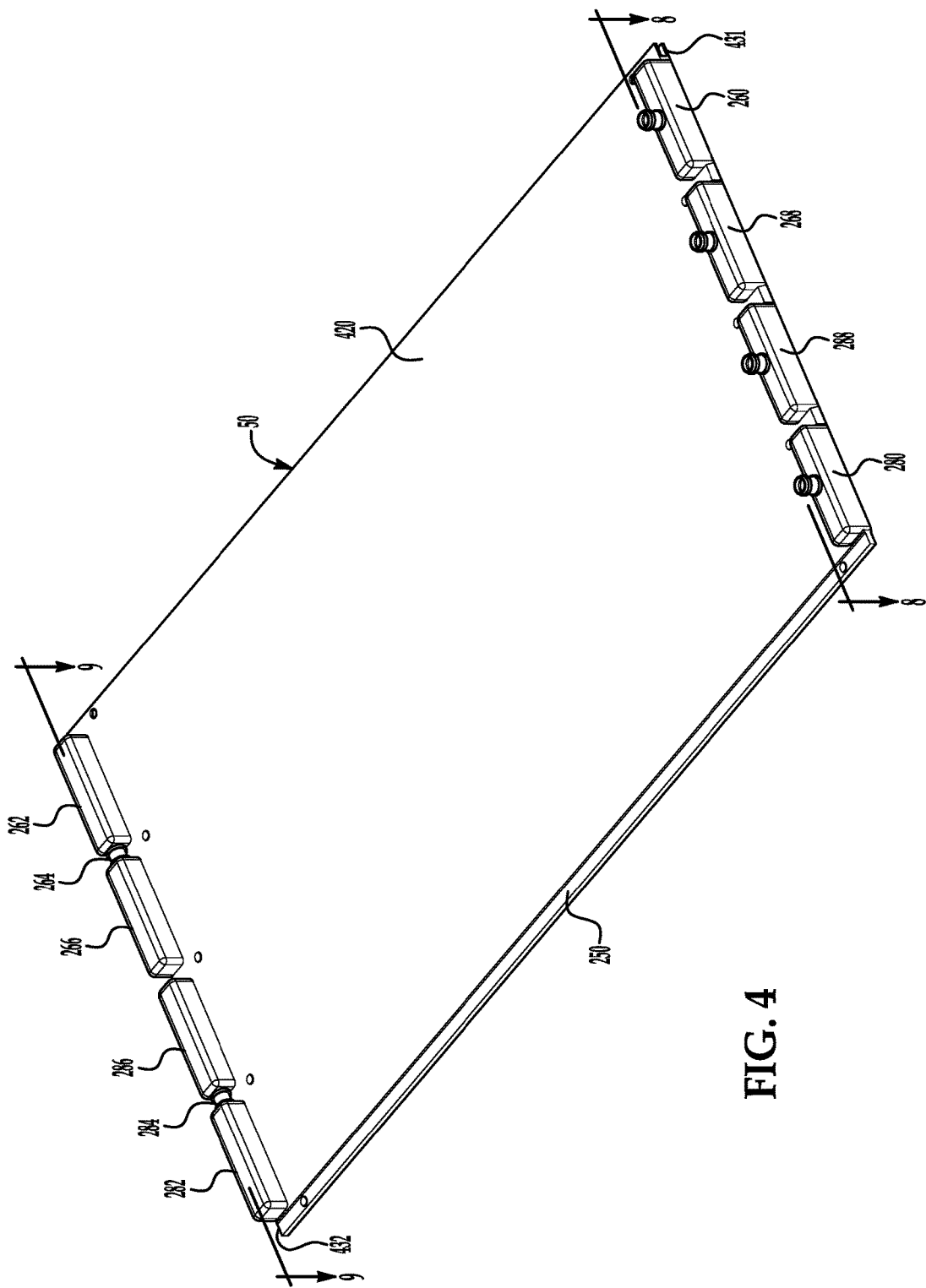
FIG. 4 is a schematic of a cooling plate utilized in the battery pack of FIG. 1 in accordance with an exemplary embodiment.

Referring to FIGS. 2-4, the battery module 40 includes battery cells 70, 72, 74, 76, 78, 80, 82, 84, 86, 88, 90, 92, 94, 96, 98, 100, frame members 120, 122, 124, 126, 128, 130, 132, 134, 136, 138, cooling fins 160, 162, 164, 166, 168, 170, 172, 174, and a bottom surface 180. In an exemplary embodiment, the frame members 120-138 are constructed of plastic, and the cooling fins 160-174 are constructed of a thermally conductive material such as aluminum for example.

The battery cells 70-100 extend in a first direction perpendicular to the longitudinal axis 38 (shown in FIG. 3) and perpendicular to the coolant flow. In particular, the first direction is perpendicular to the longitudinal axis 38 and extends from a first longitudinal edge 441 toward a second longitudinal edge 442 of a sheet member 250 of the cooling plate 50.

The frame members 120, 122 are coupled together and hold the battery cell 70 and a vertical plate portion 181 of the cooling fin 160 therebetween such that the battery cell 50 is disposed against the vertical plate portion 181. A horizontal plate portion 182 of the cooling fin 160 (which defines a portion of the bottom surface 180 of the battery module 40) is disposed directly on a top surface 420 of the cooling plate 50.

The frame members 122, 124 are coupled together and hold the vertical plate portion 181 of the cooling fin 160, the battery cells 72, 74, and a vertical plate portion 183 of the cooling fin 162 therebetween such that the battery cell 72 is disposed against the vertical plate portion 181, and the battery cell 74 is disposed against and between the battery cell 72 and the vertical plate portion 183. A horizontal plate portion 184 of the cooling fin 162 (which defines a portion of the bottom surface 180 of the battery module 40) is disposed directly on the top surface 420 of the cooling plate 50.

The frame members 124, 126 are coupled together and hold the vertical plate portion 183 of the cooling fin 162, the battery cells 76, 78, and a vertical plate portion 185 of the cooling fin 164 therebetween such that the battery cell 76 is disposed against the vertical plate portion 183, and the battery cell 78 is disposed against and between the battery cell 76 and the vertical plate portion 185. A horizontal plate portion 186 of the cooling fin 164 (which defines a portion of the bottom surface 180 of the battery module 40) is disposed directly on the top surface 420 of the cooling plate 50.

The frame members 126, 128 are coupled together and hold the vertical plate portion 185 of the cooling fin 164, the battery cells 80, 82, and a vertical plate portion 187 of the cooling fin 166 therebetween such that the battery cell 80 is disposed against the vertical plate portion 185, and the battery cell 82 is disposed against and between the battery cell 80 and the vertical plate portion 187. A horizontal plate portion 188 of the cooling fin 166 (which defines a portion of the bottom surface 180 of the battery module 40) is disposed directly on the top surface 420 of the cooling plate 50.

The frame members 128, 130 are coupled together and hold the vertical plate portion 187 of the cooling fin 166, the battery cells 84, 86, and a vertical plate portion 189 of the cooling fin 168 therebetween such that the battery cell 84 is disposed against the vertical plate portion 187, and the battery cell 86 is disposed against and between the battery cell 84 and the vertical plate portion 189. A horizontal plate portion 190 of the cooling fin 168 (which defines a portion of the bottom surface 180 of the battery module 40) is disposed directly on the top surface 420 of the cooling plate 50.

The frame members 130, 132 are coupled together and hold the vertical plate portion 189 of the cooling fin 168, the battery cells 88, 90, and a vertical plate portion 191 of the cooling fin 170 therebetween such that the battery cell 88 is disposed against the vertical plate portion 189, and the battery cell 90 is disposed against and between the battery cell 88 and the vertical plate portion 191. A horizontal plate portion 192 of the cooling fin 170 (which defines a portion of the bottom surface 180 of the battery module 40) is disposed directly on the top surface 420 of the cooling plate 50.

The frame members 132, 134 are coupled together and hold the vertical plate portion 191 of the cooling fin 170, the battery cells 92, 94, and a vertical plate portion 193 of the cooling fin 172 therebetween such that the battery cell 92 is disposed against the vertical plate portion 191, and the battery cell 94 is disposed against and between the battery cell 92 and the vertical plate portion 193. A horizontal plate portion 194 of the cooling fin 172 (which defines a portion of the bottom surface 180 of the battery module 40) is disposed directly on the top surface 420 of the cooling plate 50.

The frame members 134, 136 are coupled together and hold the vertical plate portion 193 of the cooling fin 172, the battery cells 96, 98, and a vertical plate portion 195 of the cooling fin 174 therebetween such that the battery cell 96 is disposed against the vertical plate portion 193, and the battery cell 98 is disposed against and between the battery cell 96 and the vertical plate portion 195. A horizontal plate portion 196 of the cooling fin 174 (which defines a portion of the bottom surface 180 of the battery module 40) is disposed directly on the top surface 420 of the cooling plate 50.

The frame members 136, 138 are coupled together and hold the battery cell 100 and a vertical plate portion 195 of the cooling fin 196 therebetween such that the battery cell 100 is disposed against the vertical plate portion 195. A horizontal plate portion 196 of the cooling fin 174 (which defines a portion of the bottom surface 180 of the battery module 40) is disposed directly on the top surface 420 of the cooling plate 50.

Referring to FIGS. 1 and 3, the battery module 42 has a bottom surface 200 that is disposed on a top surface 420 of the sheet member 250 of the cooling plate 50. Further, the battery module 44 has a bottom surface 210 that is disposed on the top surface 420 of the sheet member 250 of the cooling plate 50. Also, the battery module 46 has a bottom surface 220 that is disposed on the top surface 420 of the cooling plate 50.

Figure 5:
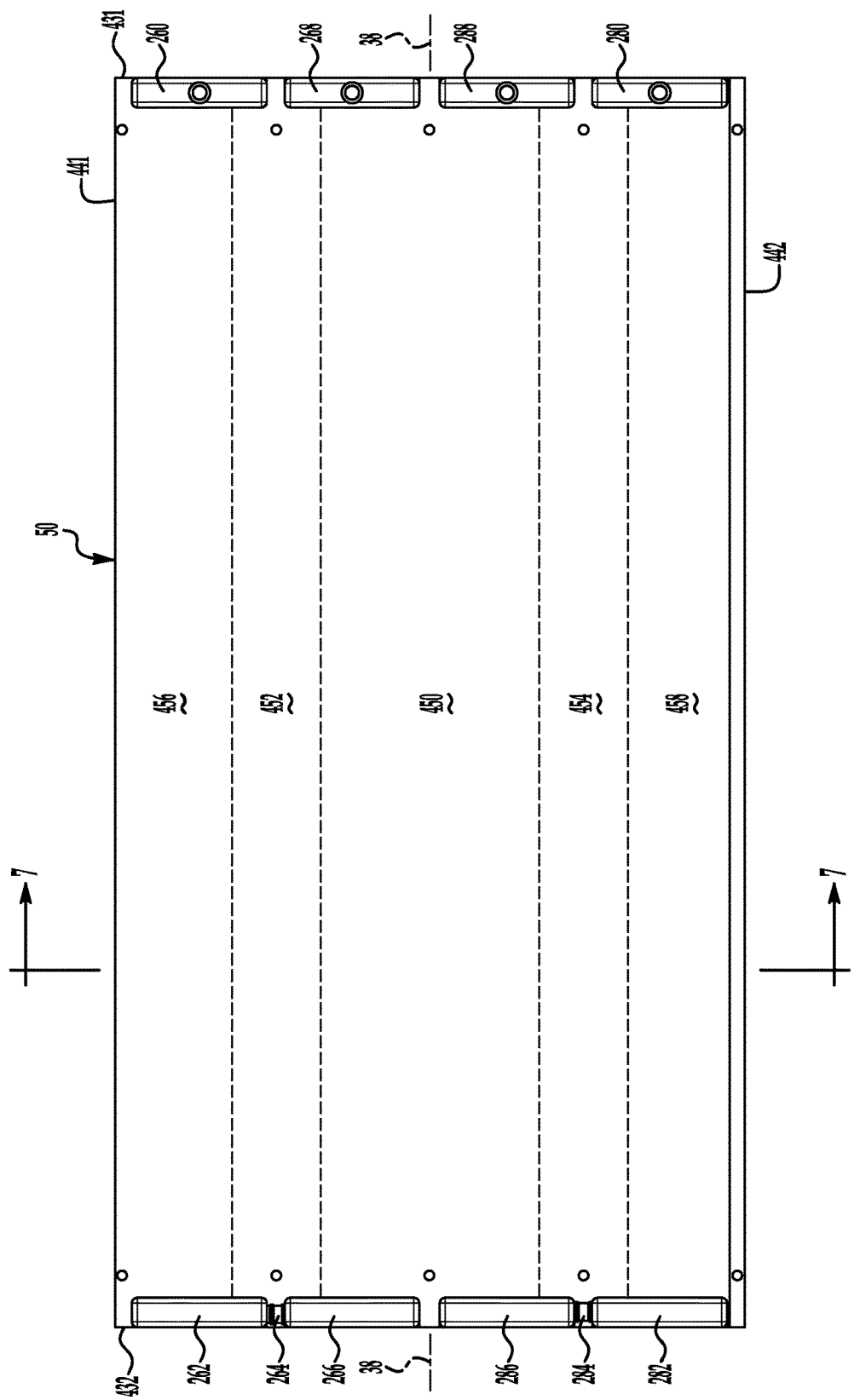
FIG. 5 is a schematic of a top view of the cooling plate of FIG. 4.
Figure 10:
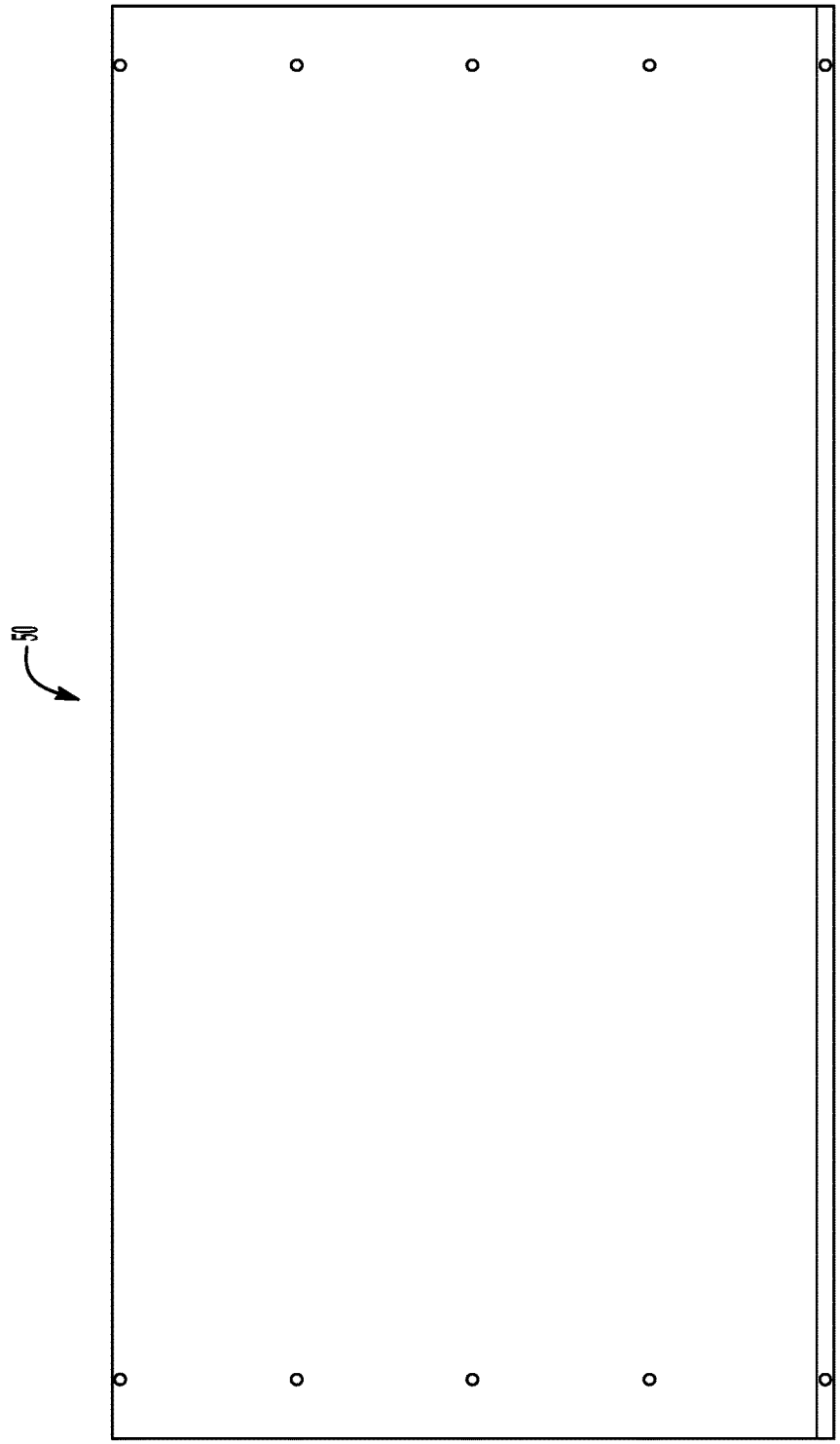
FIG. 10 is a schematic of a bottom view of the cooling plate of FIG. 4.

Referring to FIGS. 4 and 5, the cooling plate 50 is provided to cool the battery modules 40, 42, 44, 46. The cooling plate 50 includes a sheet member 250, manifolds 260, 262, a conduit 264, manifolds 266, 268, 280, 282, a conduit 284, and manifolds 286, 288.

Referring to FIGS. 4, 5 and 7, the sheet member 250 extends along the longitudinal axis 38 (shown in FIG. 5) and includes flow channels 360, 361, 362, 368, 369, 370, 380, 381, 302, 388, 389, 390, the top surface 420, a bottom surface 422, a first end 431 (shown in FIG. 5), a second end 432, a first longitudinal edge 441, and a second longitudinal edge 442. In an exemplary embodiment, the sheet member 250 is constructed of a thermally conductive metal such as aluminum for example. The cross-sectional area of each of the flow channels 360, 361, 362, 368, 369, 370, 380, 381, 302, 388, 389, 390 is determined based on a desired amount of heat transfer from the respective channel. Further, in an exemplary embodiment, the flow channels 360, 361, 362, 368, 369, 370, 380, 381, 302, 388, 389, 390 are longitudinally extending flow channels that each have a consistent cross-sectional area throughout an entire longitudinal length of the respective flow channel. Further, the sheet member 250 has a central region 450, outer central regions 452, 454, and peripheral regions 456, 458.

The amount of heat transfer for each portion of the sheet member 250 directly above each respective channel is determined by a first equation: $Q=h*A*\text{delta } T$, wherein Q corresponds to the amount of heat transfer, h is a convection variable, and delta T is a temperature difference between the sheet member 250 and a battery module disposed above a respective portion of the sheet member 250. Further, the convection variable h is determined from a second equation: $h=f(T, V, p)$, wherein f correspond to a mathematical function, T corresponds to a temperature of a coolant flowing through a respective flow channel, V is the velocity of the coolant, and p is the density of the coolant.

Referring to the FIG. 5 and to the first and second equations discussed above, if a cross-sectional area of a first flow channel is less than the cross-sectional area of a second flow channel, then the velocity (V) of the coolant flowing through the first flow channel is greater than the velocity of the coolant flowing through the second flow channel. Further, the convection variable (h) associated with the portion of the sheet member 250 disposed above the first flow channel is greater than the convection variable (h) associated with the portion of the sheet member disposed above the second flow channel, and an amount of heat transfer (Q) of a portion of the sheet member 250 above the first flow channel is greater than an amount of heat transfer (Q) of another portion of the sheet member 250 above the second flow channel. Thus, inventors herein have recognized that it would be advantageous to form flow channels in the sheet member 250 having a smaller cross-sectional areas in a central region 450 of the sheet member 250 in order to have an increased amount of heat transfer in the central region 450 of the sheet member 250 (and from a central region in each of the battery modules 40, 42, 44, 46), and to form flow channels with larger cross-sectional areas in outer central regions 452, 454 of the sheet member 250, and flow channels with still larger cross-sectional areas in peripheral regions 456, 458 of the sheet member 250 to have decreased amounts of heat transfer in the outer central regions 452, 454 and the peripheral regions 456, 458 of the sheet member 250 as compared to the central region 450 of the sheet member 250.

Referring to FIGS. 5 and 7-9, the flow channels 360, 361, 362, 368, 369, 370, 380, 381, 382, 388, 389, 390 extend substantially parallel to the longitudinal axis 38 within the sheet member 250 and substantially parallel to one another. The flow channels 360, 361 are disposed directly underneath the peripheral region 456 (shown in FIG. 5) of the sheet member 250. The flow channels 362, 368 are disposed directly underneath the outer central region 452. The flow channels 369, 370, 389, 390 are disposed directly underneath the central region 450. The flow channels 382, 388 are disposed directly underneath the outer central region 454. The flow channels 380, 361 are disposed directly underneath the peripheral region 458 of the sheet member 250.

The flow channel 360 is disposed proximate to the first longitudinal edge 441 and is disposed closer to the first longitudinal edge 441 than the flow channels 361, 362, 368, 369, 370, 380, 381, 382, 388, 389, 390. The flow channel 360 has a first cross-sectional area and a coolant flowing through the flow channel 360 has a first velocity. Further, in an exemplary embodiment, the flow channel 360 has a rectangular-shaped cross-sectional shape, and the first cross-sectional area of the flow channel 360 is defined by a vertical height H1 and a width W1. The vertical height H1 is perpendicular to the longitudinal axis 38 and extends from the top surface 420 of the sheet member 250 toward the bottom surface 422 of the sheet member 250. The width W1 is perpendicular to the longitudinal axis 38 and extends from the first longitudinal edge 441 toward the second longitudinal edge 442. The flow channel 360 fluidly communicates with an interior space 504 of the manifold 260 (shown in FIG. 8), and further fluidly communicates with an interior space 514 (shown in FIG. 9) of the manifold 262.

The flow channel 361 is disposed between the flow channels 360, 362 and is disposed closer to the first longitudinal edge 441 than the flow channels 362, 368, 369, 370, 380, 381, 382, 388, 389, 390. The flow channel 361 has the first cross-sectional area and a coolant flowing through the flow channel 361 has the first velocity. Further, in an exemplary embodiment, the flow channel 361 has a rectangular-shaped cross-sectional shape, and the first cross-sectional area of the flow channel 361 is defined by a vertical height H2 and a width H2. The vertical height H2 is perpendicular to the longitudinal axis 38 and extends in a direction from the top surface 420 of the sheet member 250 toward the bottom surface 422 of the sheet member 250. The width W2 is perpendicular to the longitudinal axis 38 and extends in a direction from the first longitudinal edge 441 toward the second longitudinal edge 442. The height H2 is equal to the height H1, and the width W2 is equal to the width W1. The flow channel 361 fluidly communicates with an interior space 504 of the manifold 260 (shown in FIG. 8), and further fluidly communicates with an interior space 514 (shown in FIG. 9) of the manifold 262.

The flow channel 362 is disposed between the flow channels 361, 368 and is disposed closer to the first longitudinal edge 441 than the flow channels 368, 369, 370, 380, 381, 382, 388, 389, 390. The flow channel 362 has a second cross-sectional area (less than the first cross-sectional area of the flow channel 360) and a coolant flowing through the flow channel 362 has a second velocity greater than the first velocity through the flow channel 360. Further, in an exemplary embodiment, the flow channel 362 has a rectangular-shaped cross-sectional shape, and the second cross-sectional area of the flow channel 362 is defined by a vertical height H3 and a width W3. The vertical height H3 is perpendicular to the longitudinal axis 38 and extends in a direction from the top surface 420 of the sheet member 250 toward the bottom surface 422 of the sheet member 250. The width W3 is perpendicular to the longitudinal axis 38 and extends in a direction from the first longitudinal edge 441 toward the second longitudinal edge 442. The height H3 is less than the height H1, and the width W3 is equal to the width W1. The flow channel 362 fluidly communicates with an interior space 504 of the manifold 260 (shown in FIG. 8), and further fluidly communicates with an interior space 514 (shown in FIG. 9) of the manifold 262.

The flow channel 368 is disposed between the flow channels 362, 369 and is disposed closer to the first longitudinal edge 441 than the flow channels 369, 370, 380, 381, 382, 388, 389, 390. The flow channel 368 has the second cross-sectional area and a coolant flowing through the flow channel 368 has the second velocity greater than the first velocity through the flow channel 360. Further, in an exemplary embodiment, the flow channel 368 has a rectangular-shaped cross-sectional shape, and the second cross-sectional area of the flow channel 368 is defined by a vertical height H4 and a width W4. The vertical height H4 is perpendicular to the longitudinal axis 38 and extends in a direction from the top surface 420 of the sheet member 250 toward the bottom surface 422 of the sheet member 250. The width W4 is perpendicular to the longitudinal axis 38 and extends in a direction from the first longitudinal edge 441 toward the second longitudinal edge 442. The height H4 is less than the height H1 (and equal to height H3), and the width W4 is equal to the width W1. The flow channel 368 fluidly communicates with an interior space 534 of the manifold 268 (shown in FIG. 8), and further fluidly communicates with an interior space 524 (shown in FIG. 9) of the manifold 266.

The flow channel 369 is disposed between the flow channels 368, 370 and is disposed closer to the first longitudinal edge 441 than the flow channels 380, 381, 382, 388, 389, 390, 370. The flow channel 369 has a third cross-sectional area (less than the second cross-sectional area of the flow channel 368) and a coolant flowing through the flow channel 369 has a third velocity greater than the second velocity through the flow channel 368. Further, in an exemplary embodiment, the flow channel 369 has a rectangular-shaped cross-sectional shape, and the third cross-sectional area of the flow channel 369 is defined by a vertical height H5 and a width W5. The vertical height H5 is perpendicular to the longitudinal axis 38 and extends in a direction from the top surface 420 of the sheet member 250 toward the bottom surface 422 of the sheet member 250. The width W5 is perpendicular to the longitudinal axis 38 and extends in a direction from the first longitudinal edge 441 toward the second longitudinal edge 442. The height H5 is less than the height H4, and the width W5 is equal to the width W4. The flow channel 369 fluidly communicates with an interior space 534 of the manifold 268 (shown in FIG. 8), and further fluidly communicates with an interior space 524 (shown in FIG. 9) of the manifold 266.

The flow channel 370 is disposed between the flow channels 369, 390 and is disposed closer to the first longitudinal edge 441 than the flow channels 380, 381, 382, 388, 389, 390. The flow channel 370 has the third cross-sectional area (less than the second cross-sectional area of the flow channel 368) and a coolant flowing through the flow channel 370 has the third velocity greater than the second velocity through the flow channel 368. Further, in an exemplary embodiment, the flow channel 370 has a rectangular-shaped cross-sectional shape, and the third cross-sectional area of the flow channel 370 is defined by a vertical height H6 and a width W6. The vertical height H6 is perpendicular to the longitudinal axis 38 and extends from the top surface 420 of the sheet member 250 toward the bottom surface 422 of the sheet member 250. The width W6 is perpendicular to the longitudinal axis 38 and extends in a direction from the first longitudinal edge 441 toward the second longitudinal edge 442. The height H6 is less than the height H4 (and equal to height H5), and the width W6 is equal to the width W4. The flow channel 370 fluidly communicates with an interior space 534 of the manifold 268 (shown in FIG. 8), and further fluidly communicates with an interior space 524 (shown in FIG. 9) of the manifold 266.

The flow channel 380 is disposed proximate to the second longitudinal edge 442 and is disposed closer to the second longitudinal edge 442 than the flow channels 381, 382, 388, 389, 390, 360, 361, 362, 368, 369, 370. The flow channel 380 has the first cross-sectional area (equal to the first cross-sectional area of the flow channel 360) and a coolant flowing through the flow channel 380 has the first velocity. Further, in an exemplary embodiment, the flow channel 380 has a rectangular-shaped cross-sectional shape, and the first cross-sectional area of the flow channel 380 is defined by a vertical height H7 and a width W7. The vertical height H7 is perpendicular to the longitudinal axis 38 and extends in a direction from the top surface 420 of the sheet member 250 toward the bottom surface 422 of the sheet member 250. The width W7 is perpendicular to the longitudinal axis 38 and extends in a direction from the first longitudinal edge 441 toward the second longitudinal edge 442. The height H7 is equal to the height H1, and the width W7 is equal to the width W1. The flow channel 380 fluidly communicates with an interior space 544 of the manifold 280 (shown in FIG. 8), and further fluidly communicates with an interior space 554 (shown in FIG. 9) of the manifold 282.

The flow channel 381 is disposed between the flow channels 380, 382 and is disposed closer to the second longitudinal edge 442 than the flow channels 382, 388, 389, 390, 360, 361, 362, 368, 369, 370. The flow channel 381 has the first cross-sectional area (equal to the first cross-sectional area of the flow channel 380) and a coolant flowing through the flow channel 381 has the first velocity. Further, in an exemplary embodiment, the flow channel 381 has a rectangular-shaped cross-sectional shape, and the first cross-sectional area of the flow channel 381 is defined by a vertical height H8 and a width W8. The vertical height H8 is perpendicular to the longitudinal axis 38 and extends in a direction from the top surface 420 of the sheet member 250 toward the bottom surface 422 of the sheet member 250. The width W8 is perpendicular to the longitudinal axis 38 and extends in a direction from the first longitudinal edge 441 toward the second longitudinal edge 442. The height H8 is equal to the height H7, and the width W8 is equal to the width W7. The flow channel 381 fluidly communicates with an interior space 544 of the manifold 280 (shown in FIG. 8), and further fluidly communicates with an interior space 554 (shown in FIG. 9) of the manifold 282.

The flow channel 382 is disposed between the flow channels 381, 388 and is disposed closer to the second longitudinal edge 442 than the flow channels 360, 361, 362, 368, 369, 370, 388, 389, 390. The flow channel 382 has the second cross-sectional area (less than the first cross-sectional area of the flow channel 380) and a coolant flowing through the flow channel 382 has a second velocity greater than the first velocity through the flow channel 380. Further, in an exemplary embodiment, the flow channel 382 has a rectangular-shaped cross-sectional shape, and the second cross-sectional area of the flow channel 382 is defined by a vertical height H9 and a width W9. The vertical height H9 is perpendicular to the longitudinal axis 38 and extends in a direction from the top surface 420 of the sheet member 250 toward the bottom surface 422 of the sheet member 250. The width W9 is perpendicular to the longitudinal axis 38 and extends in a direction from the first longitudinal edge 441 toward the second longitudinal edge 442. The height H9 is less than the height H7, and the width W9 is equal to the width W7. The flow channel 382 fluidly communicates with an interior space 544 of the manifold 280 (shown in FIG. 8), and further fluidly communicates with an interior space 554 (shown in FIG. 9) of the manifold 282.

The flow channel 388 is disposed between the flow channels 382, 389 and is disposed closer to the second longitudinal edge 442 than the flow channels 360, 361, 362, 368, 369, 370, 389, 390. The flow channel 388 has the second cross-sectional area and a coolant flowing through the flow channel 388 has the second velocity greater than the first velocity through the flow channel 380. Further, in an exemplary embodiment, the flow channel 388 has a rectangular-shaped cross-sectional shape, and the second cross-sectional area of the flow channel 388 is defined by a vertical height H10 and a width H10. The vertical height H10 is perpendicular to the longitudinal axis 38 and extends in a direction from the top surface 420 of the sheet member 250 toward the bottom surface 422 of the sheet member 250. The width W10 is perpendicular to the longitudinal axis 38 and extends in a direction from the first longitudinal edge 441 toward the second longitudinal edge 442. The height H10 is less than the height H7, and the width W10 is equal to the width W7. The flow channel 388 fluidly communicates with an interior space 574 of the manifold 288 (shown in FIG. 8), and further fluidly communicates with an interior space 564 (shown in FIG. 9) of the manifold 286.

The flow channel 389 is disposed between the flow channels 388, 390 and is disposed closer to the second longitudinal edge 442 than the flow channels 360, 361, 362, 368, 369, 370, 390. The flow channel 389 has the third cross-sectional area (less than the second cross-sectional area of the flow channel 388) and a coolant flowing through the flow channel 389 has the third velocity greater than the second velocity through the flow channel 388. Further, in an exemplary embodiment, the flow channel 389 has a rectangular-shaped cross-sectional shape, and the third cross-sectional area of the flow channel 389 is defined by a vertical height H11 and a width W11. The vertical height H11 is perpendicular to the longitudinal axis 38 and extends in a direction from the top surface 420 of the sheet member 250 toward the bottom surface 422 of the sheet member 250. The width W11 is perpendicular to the longitudinal axis 38 and extends in a direction from the first longitudinal edge 441 toward the second longitudinal edge 442. The height H11 is less than the height H10, and the width W11 is equal to the width W10. The flow channel 389 fluidly communicates with an interior space 574 of the manifold 288 (shown in FIG. 8), and further fluidly communicates with an interior space 564 (shown in FIG. 9) of the manifold 286.

The flow channel 390 is disposed between the flow channels 389, 370 and is disposed closer to the second longitudinal edge 442 than the flow channels 360, 361, 362, 368, 369, 370. The flow channel 390 has the third cross-sectional area (less than the second cross-sectional area of the flow channel 388) and a coolant flowing through the flow channel 390 has the third velocity greater than the second velocity through the flow channel 388. Further, in an exemplary embodiment, the flow channel 390 has a rectangular-shaped cross-sectional shape, and the third cross-sectional area of the flow channel 390 is defined by a vertical height H12 and a width W12. The vertical height H12 is perpendicular to the longitudinal axis 38 and extends in a direction from the top surface 420 of the sheet member 250 toward the bottom surface 422 of the sheet member 250. The width W12 is perpendicular to the longitudinal axis 38 and extends in a direction from the first longitudinal edge 441 toward the second longitudinal edge 442. The height H12 is less than the height H10, and the width W12 is equal to the width W10. The flow channel 390 fluidly communicates with an interior space 574 of the manifold 288 (shown in FIG. 8), and further fluidly communicates with an interior space 564 (shown in FIG. 9) of the manifold 286.

Referring to FIGS. 2 and 4, the top surface 420 of the sheet member 250 is disposed directly on and against the bottom surfaces, 180, 200, 210, 220 of the battery modules 40, 42, 44, 46, respectively. The top surface 420 is disposed substantially parallel to the bottom surface 422 of the sheet member 250.

Referring to FIGS. 2 and 7, each of the battery cells 70-100 have a central region, outer central regions, and peripheral regions. The central region of each of the battery cells 70-100 is disposed directly above the flow channels 369, 370, 389, 390 (shown in FIG. 7). The outer central regions of each of the battery cells 70-100 are disposed directly above the flow channels 362, 368, 382, 388. Further, the peripheral regions of each of the battery cells 70-100 are disposed directly above the flow channels 360, 361, 380, 381. During operation, an amount of amount of heat energy extracted from each central region of the battery cells 70-100 by the coolant flowing through each of the flow channels 369, 370, 389, 390 is greater than an amount of energy extracted from each outer central region of the battery cells 70-100 disposed directly above the flow channels 362, 368, 382, 388. Further, an amount of heat energy extracted from each outer central region of the battery cells 70-100 by the coolant flowing through each of the flow channels 362, 368, 382, 388 is greater than an amount of energy extracted from each of the peripheral regions of the battery cells 70-100 disposed directly above the each of the flow channels 360, 361, 380, 381.

Referring to FIGS. 1, 4 and 8, the manifold 260 includes a manifold body 500 and an inlet port 502 coupled to the manifold body 500 that define an interior space 504. In an exemplary embodiment, the manifold 260 is constructed of a thermally conductive metal such as aluminum for example. The manifold body 500 is coupled to the top surface 420 of the sheet member 250 proximate to the first end 431 of the sheet member 250. The manifold 260 fluidly communicates with the flow channels 360, 361, 362. The inlet port 502 is coupled to the conduit 24 (shown in FIG. 11) and is adapted to receive a coolant from the coolant supply system 22 via the conduit 24. The coolant from the coolant supply system 22 flows through the inlet port 502 and into the interior space 504 and then flows through the flow channels 360, 361, 362 in the sheet member 250 of the cooling plate 50.

Referring to FIGS. 1, 4 and 9, the manifold 262 includes a manifold body 510 that defines an interior space 514. In an exemplary embodiment, the manifold 262 is constructed of a thermally conductive metal such as aluminum for example. The manifold body 510 is coupled to the top surface 420 of the sheet member 250 proximate to the second end 432 of the sheet member 250. The manifold 262 fluidly communicates with the flow channels 360, 361, 362. The coolant from the flow channels 360, 361, 362 flows through the interior space 514 and then flows through the conduit 264 to the interior space 524 of the manifold 266.

The manifold 266 includes a manifold body 520 that defines an interior space 524. In an exemplary embodiment, the manifold 266 is constructed of a thermally conductive metal such as aluminum for example. The manifold body 520 is coupled to the top surface 420 of the sheet member 250 proximate to the second end 432 of the sheet member 250. The manifold 266 fluidly communicates with the flow channels 368, 369, 370. The coolant from the interior space 524 flows through the flow channels 368, 369, 370 to the interior space 534 of the manifold 268.

Referring to FIGS. 1, 4 and 8, the manifold 268 includes a manifold body 530 and an outlet port 532 coupled to the manifold body 530 that define the interior space 534. In an exemplary embodiment, the manifold 268 is constructed of a thermally conductive metal such as aluminum for example. The manifold body 530 is coupled to the top surface 420 of the sheet member 250 proximate to the first end 431 of the sheet member 250. The manifold 268 fluidly communicates with the flow channels 368, 369, 370. The outlet port 532 is coupled to the conduit 26 and is adapted to receive the coolant from the interior space 534. The coolant from the interior space 534 flows through the outlet port 532 into the conduit 26 and then back to the coolant supply system 22.

Referring to FIGS. 1, 4 and 8, the manifold 280 includes a manifold body 540 and an inlet port 542 coupled to the manifold body 540 that define an interior space 544. In an exemplary embodiment, the manifold 280 is constructed of a thermally conductive metal such as aluminum for example. The manifold body 540 is coupled to the top surface 420 of the sheet member 250 proximate to the first end 431 of the sheet member 250. The manifold 280 fluidly communicates with the flow channels 380, 381, 382. The inlet port 542 is coupled to the conduit 28 (shown in FIG. 1) and is adapted to receive a coolant from the coolant supply system 22 via the conduit 28. The coolant from the coolant supply system 22 flows through the inlet port 542 into the interior space 544 and then flows through the flow channels 380, 381, 382 in the sheet member 250 of the cooling plate 50.

Referring to FIGS. 1, 4 and 9, the manifold 282 includes a manifold body 550 that defines an interior space 554. In an exemplary embodiment, the manifold 282 is constructed of a thermally conductive metal such as aluminum for example. The manifold body 550 is coupled to the top surface 420 of the sheet member 250 proximate to the second end 432 of the sheet member 250. The manifold 282 fluidly communicates with the flow channels 380, 381, 382. The coolant from the flow channels 380, 381, 382 flows through the interior space 554 and then flows through the conduit 284 to the interior space 564 of the manifold 286.

The manifold 286 includes a manifold body 560 that defines the interior space 564. In an exemplary embodiment, the manifold 286 is constructed of a thermally conductive metal such as aluminum for example. The manifold body 560 is coupled to the top surface 420 of the sheet member 250 proximate to the second end 432 of the sheet member 250. The manifold 286 fluidly communicates with the flow channels 388, 389, 390. The coolant from the interior space 564 flows through the flow channels 388, 389, 390 to the interior space 574 of the manifold 288.

Referring to FIGS. 1, 4 and 8, the manifold 288 includes a manifold body 570 and an outlet port 572 coupled to the manifold body 570 that define the interior space 574. In an exemplary embodiment, the manifold 288 is constructed of a thermally conductive metal such as aluminum for example. The manifold body 570 is coupled to the top surface 420 of the sheet member 250 proximate to the first end 431 of the sheet member 250. The manifold 288 fluidly communicates with the flow channels 388, 389, 390. The outlet port 572 is coupled to the conduit 30 and is adapted to receive the coolant from the interior space 574. The coolant from the interior space 574 flows through the outlet port 572 into the conduit 30 and then back to the coolant supply system 22.

Referring to FIG. 1, the coolant supply system 22 is provided to supply a coolant to the cooling plate 50. In particular, the coolant supply system 22 routes coolant through the conduit 24 to the manifold 260, and receives the coolant from manifold 268 via the conduit 26. Further, the coolant supply system 22 routes coolant through the conduit 28 to the manifold 280, and receives the coolant from manifold 288 via the conduit 30.

The battery pack described herein provides a substantial advantage over other battery packs. In particular, the battery pack utilizes a cooling plate that has at least first and second flow channels therein with first and second cross-sectional areas, respectively, in which the second cross-sectional area is less than the first cross-sectional area and in which a coolant traveling through the second flow channel has an increased velocity (as compared to the velocity in the first flow channel) to cool a central region of the battery module disposed on the cooling plate and directly above the second flow channel to a greater extent than a peripheral region of the battery module disposed directly above the first flow channel.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery pack, comprising:
    a battery module having a bottom surface;
    a cooling plate having a sheet member, the bottom surface being disposed on a top surface of the sheet member;
    the sheet member extending along a longitudinal axis and having first and second flow channels; the sheet member having first and second longitudinal edges, the first flow channel being disposed closer to the first longitudinal edge than the second flow channel;
    the first flow channel having a first cross-sectional area and a coolant flowing through the first flow channel having a first velocity;
    the second flow channel having a second cross-sectional area that is less than the first cross-sectional area of the first flow channel such that the coolant flowing through the second flow channel has a second velocity that is greater than the first velocity;
    a height of the second flow channel in a first direction is less than a height of the first flow channel in the first direction, the first direction being perpendicular to the longitudinal axis and extending from the top surface of the sheet member toward a bottom surface of the sheet member.

2. The battery pack of claim 1, wherein a portion of the top surface of the sheet member that is disposed directly above the second flow channel extracts an amount of heat energy from the battery module that is greater than an amount of heat energy extracted by a portion of the top surface of the sheet member that is disposed directly above the first flow channel.

3. The battery pack of claim 1, wherein a width of the first flow channel in a second direction is substantially equal to a width of the second flow channel in the second direction, the second direction being perpendicular to the longitudinal axis and extending from the first longitudinal edge toward the second longitudinal edge of the sheet member.

4. The battery pack of claim 1, wherein the battery module has a plurality of battery cells that extend in a first direction, the first direction being perpendicular to the longitudinal axis and extending from the first longitudinal edge toward the second longitudinal edge of the sheet member.

5. A battery pack, comprising:
    a battery module having a bottom surface;
    a cooling plate having a sheet member, the bottom surface being disposed on a top surface of the sheet member;
    the sheet member extending along a longitudinal axis and having first and second flow channels; the sheet member having first and second longitudinal edges, the first flow channel being disposed closer to the first longitudinal edge than the second flow channel;
    the first flow channel having a first cross-sectional area and a coolant flowing through the first flow channel having a first velocity;
    the second flow channel having a second cross-sectional area that is less than the first cross-sectional area of the first flow channel such that the coolant flowing through the second flow channel has a second velocity that is greater than the first velocity;
    a first manifold that is coupled to the top surface of the sheet member proximate to a first end of the sheet member, the first manifold fluidly communicates with the first flow channel, the first manifold is adapted to receive the coolant and to direct the coolant into the first flow channel; and
    a second manifold that is coupled to the top surface of the sheet member proximate to a second end of the sheet member, the second manifold fluidly communicates with the first flow channel; the second manifold is adapted to receive the coolant that has flowed through the first flow channel from the first manifold.

6. The battery pack of claim 5, further comprising:
    a third manifold that is coupled to the top surface of the sheet member proximate to the second end of the sheet member, the third manifold fluidly communicates with the second manifold, the third manifold is adapted to receive the coolant from the second manifold and to direct the coolant into the second flow channel.

7. The battery pack of claim 6, further comprising:
a fourth manifold that is coupled to the top surface of the sheet member proximate to the first end of the sheet member, the fourth manifold fluidly communicates with the second flow channel; the fourth manifold is adapted to receive the coolant that has flowed through the second flow channel from the third manifold.

8. A battery pack, comprising:
a battery module having a bottom surface;
a cooling plate having a sheet member, the bottom surface being disposed on a top surface of the sheet member;
the sheet member extending along a longitudinal axis and having first and second flow channels: the sheet member having first and second longitudinal edges, the first flow channel being disposed closer to the first longitudinal edge than the second flow channel;
the first flow channel having a first cross-sectional area and a coolant flowing through the first flow channel having a first velocity;
the second flow channel having a second cross-sectional area that is less than the first cross-sectional area of the first flow channel such that the coolant flowing through the second flow channel has a second velocity that is greater than the first velocity;
the first and second flow channels extending substantially parallel to the longitudinal axis within the sheet member and substantially parallel to one another, the first and second longitudinal edges of the sheet member extending substantially parallel to the longitudinal axis.

9. The battery pack of claim 8, wherein the sheet member further includes third and fourth flow channels extending substantially parallel to the longitudinal axis within the sheet member and substantially parallel to the first and second flow channels, the fourth flow channel being disposed closer to the second longitudinal edge of the sheet member than the third flow channel, the third flow channel being disposed between the second and fourth flow channels; and
the third flow channel having a third cross-sectional area that is less than the first cross-sectional area of the first flow channel and is further less than the second cross-sectional area of the second flow channel, the third flow channel having the coolant flowing through the third flow channel at a third velocity that is greater than the second velocity and greater than the first velocity.

10. The battery pack of claim 9, wherein a portion of the top surface of the sheet member disposed directly above the third flow channel extracts an amount of heat energy from the battery module that is greater than an amount of heat energy extracted by a portion of the top surface of the sheet member that is disposed directly above the second flow channel, and is further greater than an amount of heat energy extracted by a portion of the top surface of the sheet member that is disposed directly above the first flow channel.

11. The battery pack of claim 9, wherein the battery module has a plurality of battery cells extending in a first direction, the first direction being perpendicular to the longitudinal axis and extending from the first longitudinal edge toward the second longitudinal edge of the sheet member, each battery cell of the plurality of battery cells having a central region disposed at least in part directly above the third flow channel and a peripheral region disposed directly above the first flow channel, such that an amount of amount of heat energy extracted from each central region by the coolant in the third flow channel is greater than an amount of energy extracted from each peripheral region by the coolant in the first flow channel.

12. The battery pack of claim 9, wherein a height of the third flow channel in a first direction is less than a height of the second flow channel in the first direction and is further less than a height of the first flow channel in the first direction; the first direction being perpendicular to the longitudinal axis and extending from the top surface of the sheet member toward a bottom surface of the sheet member.

13. The battery pack of claim 12, wherein a width of the third flow channel in a second direction is substantially equal to a width of the second flow channel in the second direction, and is further substantially equal to a width of the first flow channel in the second direction, the second direction being perpendicular to the longitudinal axis and extending from the first longitudinal edge toward the second longitudinal edge of the sheet member.

14. The battery pack of claim 9, wherein the fourth flow channel has a fourth cross-sectional area that is substantially equal to the first cross-sectional area of the first flow channel and is further greater than the third cross-sectional area of the third flow channel, the fourth flow channel having coolant flowing therethrough at a fourth velocity.

15. The battery pack of claim 14, wherein the sheet member further includes a fifth flow channel extending substantially parallel to the longitudinal axis within the sheet member and substantially parallel to the first, second, third, and fourth flow channels; the fifth flow channel being disposed between the third and fourth flow channels; the fifth flow channel having a fifth cross-sectional area that is substantially equal to the second cross-sectional area of the second flow channel and is further greater than the third cross-sectional area of the third flow channel, the fifth flow channel having the coolant flowing therethrough at a fifth velocity.

* * * * *